Aug. 19, 1952     J. A. CUPLER, II     2,607,244
DRILLING MACHINE

Filed Oct. 6, 1950     2 SHEETS—SHEET 1

Inventor
JOHN A. CUPLER II
By Raymond W. Cotton
Attorney

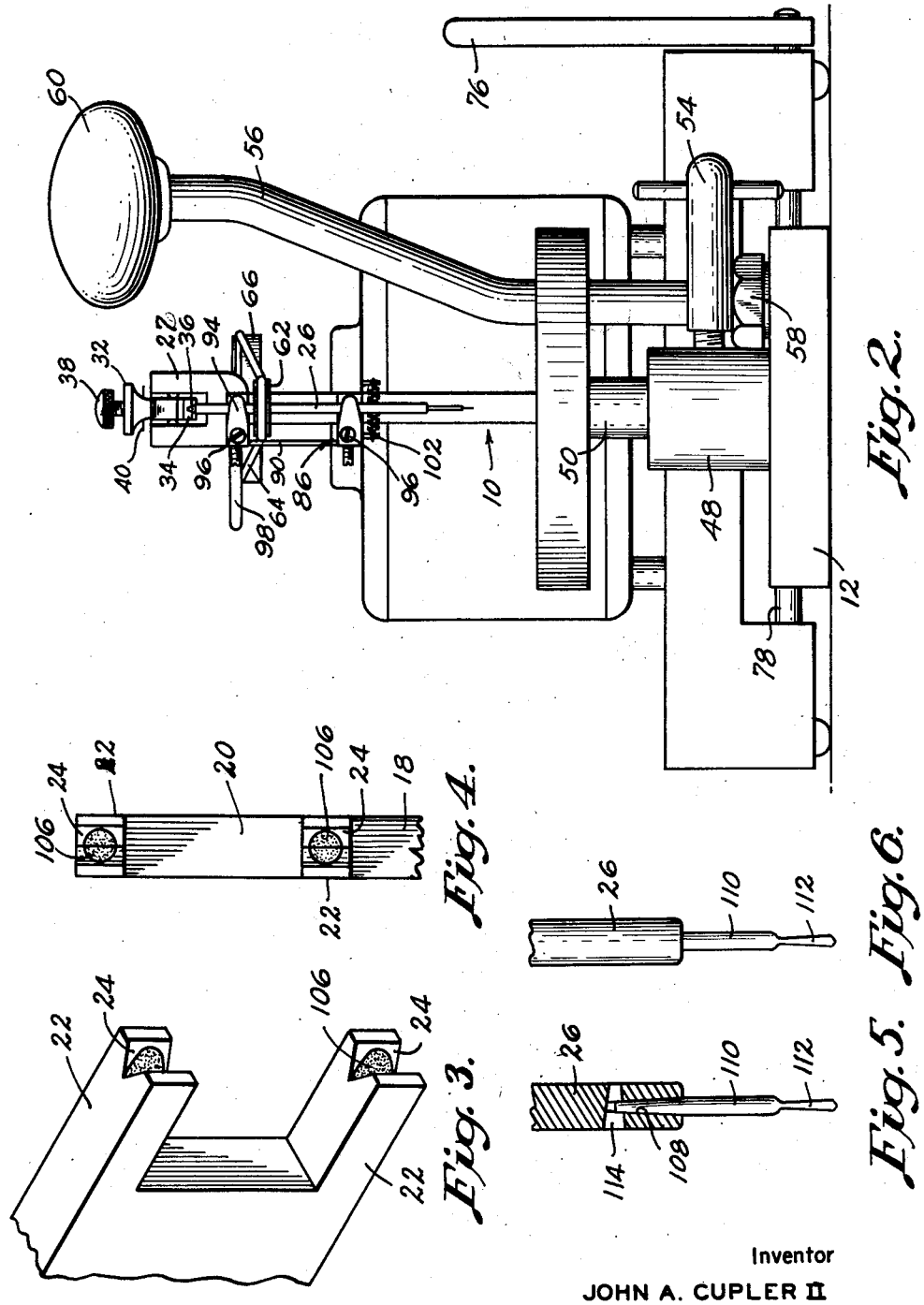

Patented Aug. 19, 1952

2,607,244

UNITED STATES PATENT OFFICE 2,607,244

DRILLING MACHINE

John A. Cupler, II, Cumberland, Md.

Application October 6, 1950, Serial No. 188,799

16 Claims. (Cl. 77—5)

This invention relates to drilling machines wherein rotation of drill spindles is confined to motion about their own axes.

The problem of maintaining a tool on its own axis has been discussed at length in a copending application, Serial No. 15,570, filed March 18, 1948, of which this application constitutes a continuation-in-part.

The bearings and other relatively moving parts of conventional drilling machines must necessarily provide tolerances, and almost inevitably possess eccentricities to some degree. Such characteristics are always adversely reflected in the work, and frequently on a magnified scale. It is with a view towards achieving improved results along these lines in drilling operations, particularly significant in the field of drilling small holes, that the present invention is primarily dedicated.

In accordance with the objects of this invention, the drilling machine comprises a frame, spaced notches defining open bearings carried by the frame to receive a spindle for rotation about its own axis and driving means for rotating the spindle in contact with the bearings. In the present case, the driving means is preferably a belt so inclined with respect to the spindle axis that the spindle is continuously biased away from the work. Thus, in feeding the spindle towards the work, the operator will be compelled to overcome this biasing effect, which effect increases as the spindle is advanced. Moreover, it is preferable in many cases contemplated herein that the spindle axis of the machine be substantially vertical, so that the notch forming surfaces defining the bearings will converge towards a common substantially vertical axis.

Actuating means for feeding the spindle may be supported by the frame, and an adjacent hand rest may be employed for increased accuracy in controlling the feed. Adjustable stops are provided in such cases to assist in limiting the extent of such feed.

Rotation of the spindle may be effected by a motor having a separate frame so as to reduce the effects of vibration, and the motor pulley is preferably elevated above a groove or pulley on the spindle to produce the biasing effects. The belt preferably engages the spindle groove or pulley intermediate the bearings, and where bending stresses on the spindle are to be maintained at a minimum, the engagement will occur closely adjacent one of the bearings.

A drill point may be integral with the spindle assuring concentricity, or the drill may be carried directly by a spindle with which it is concentric, without need for the customary intermediate chucks or collets.

The open bearings may be of the V-type and their bearing surfaces may be formed from natural or synthetic jewels such as sapphires or rubies.

The belt must be flexible and is preferably somewhat extensible and resilient to produce the desired biasing effects for all positions of the spindle feed.

A more thorough understanding of the invention and its objects will follow from a detailed description of the accompanying drawings wherein:

Fig. 2 is an elevation of the machine as it would appear from the right end of Fig. 1;

Fig. 3 is a fragmentary perspective view on an enlarged scale and partially broken away, of a detail of the machine of the preceding figures;

Fig. 4 is an elevation looking from the right end of Fig. 3;

Fig. 5 is a fragmentary section on an enlarged scale depicting one type of spindle and drill; and Fig. 6 is a fragmentary elevation on an enlarged scale depicting another type of spindle and drill assembly.

Figure 1:
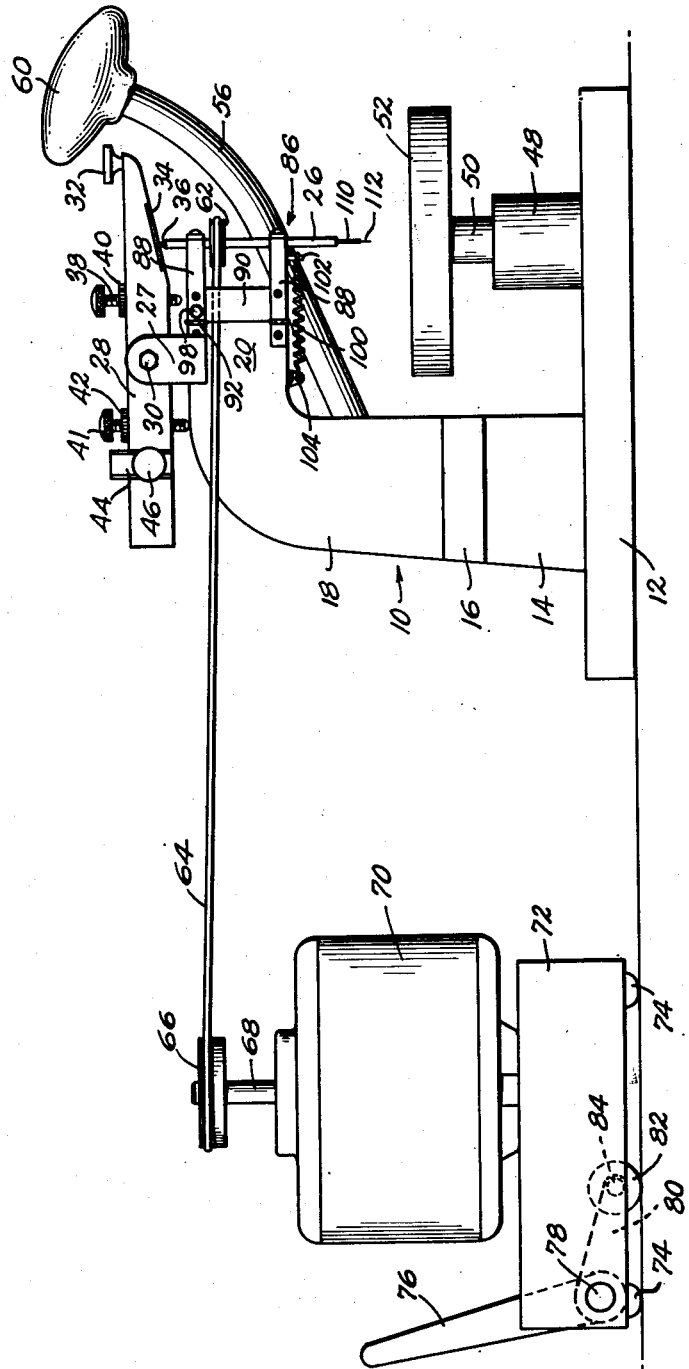
Fig. 1 is an elevation depicting a drilling machine embodying the present invention.

The frame 10 of the drilling machine comprises a base 12, a column 14 suitably secured thereto, the column having a tapered portion 16 intersecting a reduced upper portion 18 which terminates in a horizontally disposed arm 20, bifurcated to define projections 22 whose ends receive notches 24, spaced from one another to constitute V-type bearings for reception of a spindle 26.

A pair of lugs 27 upstanding from the horizontal arm of the column are in spaced relationship to receive a beam 28 which is mounted therein by means of a pivot pin 30. The forward portion of the beam carries a finger piece 32 which the operator depresses to feed the drill spindle 26 downwardly towards the work. The underside of the beam is provided with a wear plate 34 for engagement with the tapered end 36 of the spindle 26. Downward travel of the spindle is limited by means of a screw 38 threaded through a forward portion of the beam and secured in adjusted position with respect thereto by means of a lock nut 40. The upward limit of travel of the spindle is adjusted by means of a similar screw 41 threaded through the beam on the opposite side of the pivot pin 30 and locked in adjusted position by means of a nut 42. A counterweight 44 may be adjustably secured to the beam by means of a screw 46.

The base 12 has a sleeve 48 secured thereto in which the column 50 of a work table 52 is adjustably secured by means of a clamping screw 54. Also carried by the base, is a hand rest 56 whose lower end is threaded into the base and held in an adjusted position by means of a lock nut 58, and whose upper end carries a knob 60 upon which an operator can rest his hand to achieve the desired stability required in connection with the drilling of small holes.

The spindle 26 is provided with a groove or a grooved pulley 62 suitably secured thereto for imparting rotation to the spindle through a belt 64 driven by a grooved member or pulley 66 mounted on a shaft 68 of a motor 70 whose base 72 is separate from the base 12 of the column 10 to avoid the transmission of excessive vibration to the work and spindle. The motor base 72 is provided with feet 74 and with a lever 76 for the purpose of establishing and relieving belt tension. The lever 76 is secured to a shaft 78 suitably journaled in the rear portion of the base 72, an arm 80 being secured to an intermediate portion of the shaft and carrying at its end a roller 82 mounted thereon by means of a pivot 84. Thus, it will be clear that when the handle 76 is moved towards the right as viewed in Fig. 1, the rear portion of the base 72 will be elevated, relieving the tension of the belt and permitting manipulation of the spindle. It is very important to note that the belt 64 is inclined downwardly from the motor pulley 66 to the uppermost position assumed by the pulley 62 so that the spindle 26 is always biased upwardly towards the beam 28. Moreover, it is the tension of the belt alone that holds the spindle in its bearings 24, the belt thus producing two distinct biasing effects. To prevent injury to the spindle and its drill when tension on the belt is relaxed, a guard 86 has been provided, but it is preferable that no portions of this guard engage the spindle during a drilling operation. Whereas the guard may assume a variety of forms, for purposes of illustration, it has been shown as comprising a pair of horizontal arms 88 secured together by a vertical member 90 and secured to the frame by means of hinges 92. The forward ends of the horizontal bars 88 have clips 94 secured thereto by means of screws 96. An operating handle 98 is threaded into the upper arm and used for shifting the guard to and from the position shown in the drawings where it prevents accidental removal of the spindle 26. An over center spring 100 extends between a pin 102 carried by the guard and a fastener 104 carried by the frame to hold the guard in either its restraining position shown or its retracted position which it assumes when it is desired to install or remove a spindle.

The V-bearings shown in detail in Figs. 3 and 4, may contain hardened inserts 106, which may be metallic, or jewels such as natural or synthetic rubies or sapphires. However, it is well within the intent of this invention that there be no such lining or surfacing material, since extremely satisfactory results have been achieved through the use of V-notches ground directly in the ends of the projections 22.

The spindle 26 depicted in Fig. 5 has its lower end terminating in a tapered socket 108 for the reception of a complementary shank 110 of the drill point 112. The spindle is also provided with a tapered transverse opening 114 to facilitate removal of a drill in accordance with known practice. In accordance with the disclosure of Fig. 6, the drill shank 110 and point 112 are integral with the spindle 26 rendering it possible to eliminate completely any possibility of eccentricity between the drill spindle and the cutting edge itself. Excellent results can be attained where the drills are separate from the spindle however, by the exercise of proper precautions in the manufacture of both the drill and spindle. However, the presence of dust on the shank or in the socket can introduce small eccentricities which are often serious in microdrilling practice.

Inasmuch as depression of the beam 28 to feed the drill towards the work will lower the pulley 62 with respect to the motor pulley 66, the inclination of the belt will be increased, tending to increase the biasing effect upon the spindle. The belt 64 will be flexible to accommodate such changes in distances as occur in this manner, and resilient belts embodying rubber or its substitutes have been used to great advantage. Belts for this purpose have also been formed from fishing line with the production of excellent results.

By the use of the V-notches contemplated, or pairs of balls such as have been described in the copending application above mentioned of which this application is a continuation-in-part, wear of the parts becomes self-compensating and introduces no inaccuracies. Whereas the pulley 62 is secured to the spindle 26 at a point intermediate the two bearings, it will be noted that in its uppermost position as depicted in Fig. 1, the pulley is adjacent the upper bearing. This permits a maximum stroke of the spindle downwardly and has a further advantage of maintaining bending stresses on the spindle at a minimum during a majority of the time the machine is in operation.

Whereas only one specific form of the machine has been illustrated and described, machines embodying these principles have been built in several forms by the present inventor for various specific uses. Accordingly, this invention should not be restricted to the sample illustrated beyond the scope of the appended claims.

I claim:

1. A drilling machine comprising a frame, spaced pairs of notch forming surfaces carried by said frame, said surfaces defining spindle bearings converging towards a common axis, driving means for rotating a spindle in contact with at least one point of each of said bearing surfaces and parallel to said axis, and actuating means for feeding said spindle axially relative to said bearings.

2. A drilling machine comprising a frame, spaced pairs of notch forming surfaces defining open bearings carried by said frame, a spindle having a substantially vertical axis received in said bearings in contact with at least one point of each of said surfaces, driving means for rotating said spindle about said axis in contact with said bearings, and actuating means for feeding said spindle axially relative to said bearings.

3. A drilling machine comprising a frame, spaced pairs of notch forming surfaces defining spindle bearings carried by said frame, a drill spindle received in said bearings in contact with at least one point of each of said surfaces, spindle rotating means biasing said spindle into engagement with said bearings, and actuating means for feeding said spindle along a vertical axis relative to said bearings.

4. A drilling machine comprising a frame, spaced pairs of notch forming surfaces defining spindle bearings carried by said frame, a drill spindle received in said bearings in contact with at least one point of each of said surfaces, means biasing said spindle into contact with said bearings and in one direction along the longitudinal axis of said spindle, and actuating means for feeding said spindle in an opposite direction along said axis.

5. A drilling machine comprising a frame, spaced pairs of notch forming surfaces defining vertically aligned spindle bearings carried by said frame, a drill spindle received in said bearings in contact with at least one point of each of said surfaces, a pulley secured to said spindle, a driving belt received by said pulley, said belt biasing said spindle towards said bearings and in one vertical direction, and actuating means for feeding said spindle axially relative to said bearings in opposition to the vertical biasing effect of said belt.

6. A drilling machine comprising a frame, spaced pairs of notch forming surfaces defining substantially vertically aligned spindle bearings carried by said frame, a drill spindle received in said bearings in contact with at least one point of each of said surfaces, frictional driving means imparting rotation to said spindle and simultaneously biasing said spindle vertically upwardly and laterally into engagement with said bearings, and actuating means for feeding said spindle downwardly relative to said bearings and increasing the biasing effect of said driving means.

7. A drilling machine comprising a frame, spaced pairs of notch forming surfaces defining open aligned spindle bearings, a drill spindle received in said bearings in contact with at least one point of each of said surfaces for rotation about its axis, a driving belt inclined at an acute angle to said axis for rotating said spindle and biasing said spindle towards said bearings and in one direction along its said axis, and actuating means for feeding said spindle relative to said bearings in another direction along said axis.

8. A drilling machine comprising a frame, spaced pairs of notch forming surfaces defining vertically aligned spindle bearings carried by said frame, a drill spindle received in said bearings in contact with at least one point of each of said surfaces, driving means imparting rotation to said spindle intermediate said bearings, said driving means biasing said spindle towards said bearings and axially in one direction, and actuating means for feeding said spindle axially in another direction.

9. A drilling machine comprising a frame, spaced pairs of notch forming surfaces defining aligned spindle bearings carried by said frame, a drill spindle received in said bearings in contact with at least one point of each of said surfaces, driving means biasing said spindle in two dimensions and imparting rotation to said spindle at a position unequally spaced between said bearings, and actuating means for feeding said spindle axially relative to said bearings.

10. A drilling machine comprising a frame, spaced pairs of notch forming surfaces defining aligned spindle bearings carried by said frame, a drill spindle received in said bearings in contact with at least one point of each of said surfaces, a drill point carried by said spindle and coaxial therewith, flexible driving means for rotating said spindle in contact with said bearings and biasing said spindle substantially vertically in one direction, and actuating means for feeding said spindle substantially vertically in another direction.

11. A drilling machine comprising a frame, spaced pairs of notch forming surfaces carried by said frame, said surfaces defining substantially V-shaped spindle bearings, a spindle received in said bearings in contact with at least one point of each of said surfaces for rotation about its own axis, said spindle providing a drill socket, driving means for rotating said spindle in contact with said bearings and biasing said spindle in one direction along said axis, and actuating means for feeding said spindle in the other direction along said axis.

12. A drilling machine comprising a frame, spaced pairs of notch forming surfaces defining vertically aligned spindle bearings carried by said frame, a spindle received in said bearings in contact with at least one point of each of said surfaces for rotation about its own axis, a pulley secured to said spindle intermediate said bearings, a driving pulley displaced horizontally and vertically above said spindle pulley, a belt interconnecting said pulleys rotating said spindle and biasing said spindle towards said bearings and axially in one direction, and manually operated means for feeding said spindle axially in another direction.

13. A drilling machine comprising a frame, spaced pairs of notch forming surfaces defining open bearings carried by said frame, a spindle received in said bearings in contact with at least one point of each of said surfaces for rotation about its own axis, a motor for rotating said spindle, and a belt under tension inclined at an acute angle to said spindle axis interconnecting said motor and spindle.

14. The invention as set forth in claim 13 wherein a drill point is concentric with said spindle and directly carried thereby.

15. The invention as set forth in claim 13 wherein a drill point is integral with said spindle.

16. The invention as set forth in claim 13 wherein said belt is resilient.

JOHN A. CUPLER, II.

REFERENCES CITED

The following references are of record in the file of this patent:

UNITED STATES PATENTS

| Number | Name | Date |
| --- | --- | --- |
| 108,890 | Deatrik | Nov. 1, 1870 |
| 321,196 | Eberhardt | June 30, 1885 |

FOREIGN PATENTS

| Number | Country | Date |
| --- | --- | --- |
| 431,267 | France | Sept. 6, 1911 |